June 12, 1956  E. GOMONET  2,750,536
SYSTEM FOR ENERGIZING AN ELECTRIC DISCHARGE TUBE
Original Filed March 19, 1946

INVENTOR:
EDOUARD GOMONET
By: Young, Emery & Thompson
Atty.

United States Patent Office 2,750,536
Patented June 12, 1956

2,750,536

SYSTEM FOR ENERGIZING AN ELECTRIC DISCHARGE TUBE

Edouard Gomonet, Paris, France, assignor to Societe Anonyme pour les Applications de l'Electricite et des Gaz Rares-Etablissements Claude-Paz et Silva, Paris, France Original application March 19, 1946, Serial No. 655,477. Divided and this application January 8, 1951, Serial No. 204,849

Claims priority, application France April 24, 1945

7 Claims. (Cl. 315—281)

This invention relates to a system for energizing one or more electric discharge tubes from an alternating current source, and, more particularly, to a system for altering the intensity curve of the current passing through said tube.

The present application is a division of my co-pending application, Serial No.655,477, filed March 19, 1946, entitled "Method and apparatus for altering the current curve flowing through devices supplied by alternating current mains," now abandoned.

Alternating current mains supply a voltage of practically sine wave-form. The devices supplied with this voltage usually receive alternating current which may remain substantially of sine wave form or, on the contrary, depart to a marked extent from such form, for example due to the saturation of the core, and may even exhibit non-negligible horizontal portions during which the current is nil. All these forms of current are not suitable for certain applications. For example, when a sine wave voltage serves to supply an electric discharge lamp, the variations in the luminous intensity which accompany the current variations are sufficiently important to produce flickering and, above all, troublesome stroboscopic effects; even the use of solid luminescent substances producing, by phosphorescence, a certain luminous afterglow, is not sufficient to bring about a complete disappearance of these effects. It is therefore desirable, for certain applications of the alternating current, to render the instantaneous intensity of the current passing through the utilization apparatus as constant as possible during the whole course of the half-period.

One object of this invention is to provide a novel system for energizing an electric discharge tube from an alternating current source, whereby the intensity curve of the current passing through said tube is altered, for instance in order to lessen the stroboscopic effect of the tube.

Another object of this invention is to provide an energizing system for an electric discharge tube, said system comprising a source of alternating current, a circuit connecting said source to said tube, and a device in electromagnetic relationship with said circuit and comprising a stationary portion and a movable portion, said movable portion being actuated by a synchronous motor energized by said source of current, whereby the intensity curve of the current passing through said discharge tube is different from the curve of the current intensity through said tube when said movable portion permanently occupies one of the positions it periodically assumes. The adjective "electromagnetic" can have here, as well as in any part of this application, any of the usual senses of this term taken with its broadest meaning, from the purely electrical to the purely magnetic senses.

Other objects and advantages of this invention will be apparent to those skilled in the art from the following description of several embodiments thereof.

Reference is now made to the drawings hereunto attached, where:

Figure 1:
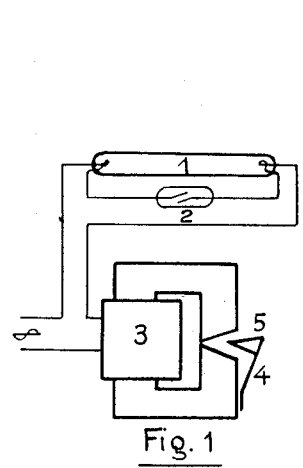
Figure 1 is a circuit diagram showing an electric discharge tube and the energizing system therefor.

In the circuit shown in Figure 1, the electric discharge lamp 1, provided with a bi-metallic ignition strip 2, is mounted in series with a stabilization inductance coil 3. When at rest, a spring blade 4 holds a ferro-magnetic member 5 in its position the most remote from the triangle-shaped air gap shown. During passage of the current in the lamp, the member 5 is attracted by the core, reduces the air gap and thus counteracts the rise in the current intensity which would take place if the member 5 would remain stationary. When the intensity decreases, the force of the spring overcomes the magnetic attraction, the member 5 moves away again, so that the drop in the current intensity is delayed, and so on at each half period.

Figure 2:
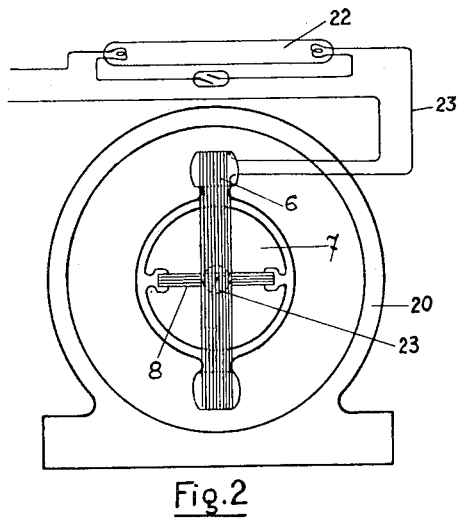
Figure 2 shows a device intended to periodically alter the stabilization of an electric discharge tube.

The periodical variation of the value of the stabilization inductance coil 3 may also be carried out in accordance with Figure 2. The winding 6 of the inductance coil is wound around a stator in which rotates a rotor 7 keyed on the shaft 21 of a synchronous motor 20 and carrying a short-circuit winding 8. The periodical variation of the mutual inductance between the windings 6 and 8 confers to 6 an apparent self-induction which varies periodically.

The curve of the current intensity passing through an electric discharge tube 22 connected through wire 23 with an extremity of the winding 6 is thereby modified. By keying the rotor 7 on the shaft in a suitable position, this curve may be made to have a substantially flattened shape.

Figure 3:
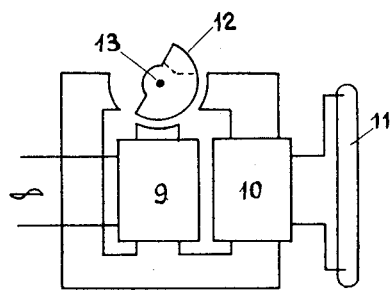
Figure 3 is another circuit diagram showing an electric discharge tube and the energizing system therefor.

Figure 3 relates to a circuit making use of a transformer having a magnetic shunt. The mains are connected to the primary circuit 9 and the secondary circuit 10 supplies the tube 11. A part 12 of suitable shape oscillates about an axis 13 at a frequency double that of the mains. At the beginning of the half-period, the magnetic shunt has a large air gap and the tube is easily lighted. Thereafter the member 12 passes gradually in front of the magnetic shunt, thus preventing the intensity from rising to too great an extent in the tube. This effect may be increased by conferring to the member 12 a shape as shown in dotted lines in order that the section for the passage of the flux into the branch leading to the secondary circuit may decrease, whilst it increases towards the magnetic shunt.

Figure 4:
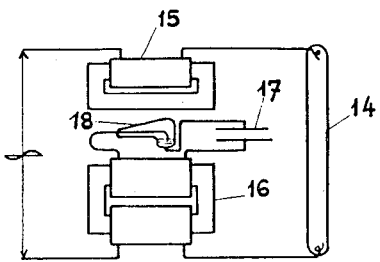
Figure 4 is still another circuit diagram showing an electric discharge tube and the energizing system therefor.

The operation of the circuit shown in Figure 4 is as follows: The tube 14 is mounted in series with an inductance coil 15 and a winding of a transformer 16, the other winding of which is connected to a condenser 17 through the medium of a mercury switch 18; when the tube goes out, because the voltage at its terminals passes through a value which is too low, the movable blade of the mercury switch, which was previously attracted by the iron of the inductance coil 15, whereby the switch was held open, is no longer attracted by the iron, the switch is closed and the condenser, which had become charged at the end of the preceding contact closing phase, is discharged into the transformer 16, thereby inducing in the tube circuit a voltage which facilitates the ignition of the tube. As the voltage of the mains increases, the current intensity increases, the condenser is charged in the reverse direction, then the movable blade is attracted by the coil 15, thereby opening the switch, and so on at each half-period. The movable blade must have such a tension and such an inertia that it breaks the circuit near the maximum condenser voltage, so that the current to be interrupted is almost nil and the ignition overvoltage at the next half-period is at a maximum.

Figure 5:
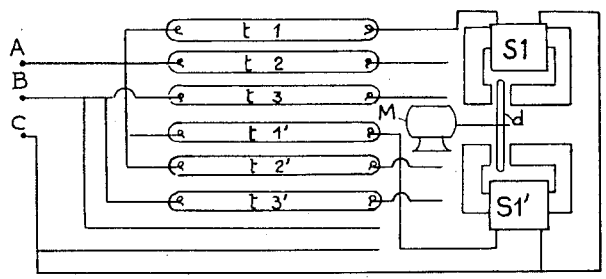
Fig. 5 is a circuit diagram showing a plurality of electric discharge tubes and the energizing system therefor.

Figure 5 relates to a three-phase installation comprising the electric systems for feeding several tubes. The tubes $t_1$, $t_1^1$, stabilized by a pair of inductance coils $S_1$, $S_1^1$, are supplied by the phase AC, the tubes $t_2$, $t_2^1$, likewise stabilized by a second pair of inductance coils, are supplied by the phase BA and the tubes $t_3$, $t_3^1$, likewise stabilized by a third pair of inductance coils, are supplied by the phase CB. The six inductance coils are regularly distributed, around a disc $d$ which enters the air gap of each of them, in the following order: $S_1$, one coil of the second pair, one coil of the third pair, $S'_1$, the second coil of the second pair, and the second coil of the third pair. This disc comprises two ferro-magnetic sectors separated by carved out or non-magnetic portions. It is driven by the synchronous motor M rotating at the rate of one revolution per period, said rotation causing the value of the stabilization coils to alter in a manner comparable to that of the devices of Figures 1 and 2. For larger installations, several discs may be driven by the same motor and a larger number of inductance coils may be arranged around each disc which will then have more than two ferro-magnetic sectors and a smaller speed. These larger current feeding systems are preferably grouped in a noise-proof cabinet.

I claim:

1. In combination, a source of alternating current, a synchronous motor energized by said source of current, an electric discharge tube, means for connecting said tube to said source and for stabilizing the discharge in the tube, said means comprising a stationary member and a movable member in electromagnetic mutual relationship, said movable member being dissymmetric, at least in one respect controlling said electromagnetic mutual relationship, about at least one plane passing through an instantaneous rotary movement axis of its movement, and means for mechanically connecting said synchronous motor to said movable member.

2. In combination, a source of alternating current, a synchronous motor energized by said source of current, an electric discharge tube, means for connecting said tube to said source and for stabilizing the discharge in the tube, said means comprising a stationary winding and a movable winding in mutual inductive relationship, said movable winding being dissymmetric, at least in one respect controlling said inductive mutual relationship, about at least one plane passing through an instantaneous rotary movement axis of its movement, and means for mechanically connecting said synchronous motor to said movable winding.

3. In combination, a source of alternating current, a synchronous motor energized by said source of current, an electric discharge tube, means for connecting said tube to said source and for stabilizing the discharge in the tube, said means comprising a stationary member and a ferromagnetic movable member in mutual magnetic relationship, said ferromagnetic movable member being dissymmetric, at least in one respect controlling said magnetic mutual relationship, about at least one plane passing through an instantaneous rotary movement axis of its movement, and means for mechanically connecting said synchronous motor to said ferromagnetic movable member.

4. In combination, a source of alternating current, a synchronous motor energized by said source of current, an electric discharge tube, means for connecting said tube to said source and for stabilizing the discharge in the tube, said means comprising a stationary member and a movable member in electromagnetic mutual relationship, said movable member being dissymmetric, at least in one respect controlling said electromagnetic mutual relationship, about at least one plane passing through an instantaneous rotary movement axis of its movement, and means for imparting a rotary movement to said movable member, said means being energized by said synchronous motor.

5. In combination, a source of alternating current, a synchronous motor energized by said source of current, an electric discharge tube, means for connecting said tube to said source and for stabilizing the discharge in the tube, said means comprising a stationary member and a movable member in electromagnetic mutual relationship, and means for imparting a rotary movement to said movable member, said means being energized by said synchronous motor, the axis of said rotation being other than an axis of revolution for the shape of said movable member.

6. In combination, a source of alternating electric current, a synchronous motor energized by said source of current, an electric discharge tube, a transformer comprising a primary winding connected to said source, a secondary winding connected to said tube, and a magnetic circuit, said magnetic circuit being provided with a shunt leg, with a movable ferromagnetic portion, and with at least one air gap situated between said movable portion and the other parts of the magnetic circuit, and means for mechanically connecting said synchronous motor to said movable portion, said movable portion being dissymmetric, at least in one respect controlling its magnetic characteristics, about at least one plane passing through an instantaneous rotary movement axis of its movement.

7. In combination, a source of alternating electric current, a synchronous motor energized by said source of current, a plurality of electric discharge tubes, a plurality of means for connecting said source respectively to each of said tubes and for stabilizing the discharge in the tubes, and a movable member in electromagnetic relationship with each of said means, said movable member being dissymmetric, at least in one respect controlling said electromagnetic relationship, about at least one plane passing through an instantaneous rotary movement axis of its movement, and means for mechanically connecting said synchronous motor to said movable member.

References Cited in the file of this patent

UNITED STATES PATENTS

| 2,278,061 | Dalkowitz | Mar. 31, 1942 |
| 2,305,153 | Fries | Dec. 15, 1942 |
| 2,359,021 | Campbell | Sept. 26, 1944 |
| 2,359,057 | Skinner | Sept. 26, 1944 |
| 2,541,033 | Cates | Feb. 13, 1951 |

FOREIGN PATENTS

| 501,026 | Great Britain | Feb. 20, 1939 |